US009512006B2

(12) United States Patent
Kim et al.

(10) Patent No.: US 9,512,006 B2
(45) Date of Patent: Dec. 6, 2016

(54) SECONDARY STRUCTURE OF CARBON NANOSTRUCTURE, BUNDLE THEREOF AND COMPOSITE COMPRISING SAME

(71) Applicant: LG Chem, Ltd., Seoul (KR)

(72) Inventors: SungJin Kim, Daejeon (KR); Jindo Kim, Daejeon (KR); KyungYeon Kang, Daejeon (KR); JaeKeun Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/824,925

(22) PCT Filed: Dec. 21, 2012

(86) PCT No.: PCT/KR2012/011271
§ 371 (c)(1),
(2) Date: Mar. 18, 2013

(87) PCT Pub. No.: WO2013/095045
PCT Pub. Date: Jun. 27, 2013

(65) Prior Publication Data
US 2014/0329085 A1 Nov. 6, 2014

(51) Int. Cl.
*B32B 9/00* (2006.01)
*C01B 31/02* (2006.01)
(Continued)

(52) U.S. Cl.
CPC ........... *C01B 31/0233* (2013.01); *B82B 1/001* (2013.01); *C01B 31/02* (2013.01); *C01B 31/022* (2013.01); *B82Y 30/00* (2013.01); *B82Y 40/00* (2013.01); *Y10T 428/2918* (2015.01); *Y10T 428/30* (2015.01)

(58) Field of Classification Search
CPC ............ C01B 31/022; C01B 2202/00; B32B 2313/04; C23C 16/26
USPC ........................ 428/408; 423/447.1; 977/742
See application file for complete search history.

(56) References Cited

U.S. PATENT DOCUMENTS

2003/0211029 A1* 11/2003 Someya et al. ............ 423/447.3
2004/0022718 A1* 2/2004 Stupp et al. ............... 423/445 R
(Continued)

FOREIGN PATENT DOCUMENTS

JP 2006-124266 A 5/2006
JP 2006-169072 A 6/2006
(Continued)

OTHER PUBLICATIONS

J.Li, "Highly-Ordered Carbon Nanotube Arrays for Electronics Applications." Applied Physics Letters; American Institute of Physics. 1999; vol. 75, pp. 367-369.
(Continued)

*Primary Examiner* — Daniel H Miller
(74) *Attorney, Agent, or Firm* — Dentons US LLP

(57) ABSTRACT

The present invention relates to a novel secondary structure of carbon nanostructures, a bundle thereof and a composite comprising the same. The secondary structure according to the present invention is characterized that it is formed by a plurality of carbon nanostructures (CNSs) assembled to have a tube form in whole or in part.
The novel secondary structure according to the present invention, the bundle thereof and the composite comprising the same are highly applicable in fields of energy materials, functional composites, batteries, semiconductors and the like.

16 Claims, 17 Drawing Sheets

(51) Int. Cl.
  *B82B 1/00* (2006.01)
  *B82Y 30/00* (2011.01)
  *B82Y 40/00* (2011.01)

(56) References Cited

U.S. PATENT DOCUMENTS

| | | | |
|---|---|---|---|
| 2005/0095938 A1* | 5/2005 | Rosenberger et al. | 442/194 |
| 2007/0172410 A1* | 7/2007 | Hikata | 423/447.3 |
| 2007/0243124 A1* | 10/2007 | Baughman et al. | 423/447.1 |
| 2010/0055338 A1 | 3/2010 | Kim et al. | |
| 2012/0114550 A1* | 5/2012 | Bahattab et al. | 423/447.1 |

FOREIGN PATENT DOCUMENTS

| | | |
|---|---|---|
| JP | 2008-120658 A | 5/2008 |
| JP | 2009-057249 A | 3/2009 |

OTHER PUBLICATIONS

Zhong, Xiao-Hua. "Continuous Multilayered Carbon Nanotube Yarns." Advanced Materials. Wiley-VCH; 2010; vol. 22; pp. 692-695.

* cited by examiner (a)

(b)

b) Al(OH)₃   b) Al₂O₃ (SA63158)

SECONDARY STRUCTURE OF CARBON NANOSTRUCTURE, BUNDLE THEREOF AND COMPOSITE COMPRISING SAME

This application is a National Stage Entry of International Application No. PCT/KR2012/011271, filed Dec. 21, 2012, and claims the benefit of Korean Application Nos. 10-2011-0139150 filed on Dec. 21, 2011, and 10-2012-0143568 filed on Dec. 11, 2012 and all of which are hereby incorporated by reference in their entirety for all purposes as if fully set forth herein.

FIELD OF THE INVENTION

The present invention relates to a novel secondary structure of carbon nanostructures, a bundle thereof and a composite comprising same.

BACKGROUND OF THE INVENTION

Carbon nanostructures (CNSs) refer to nano-sized carbon structures having various shapes such as nanotube, fullerene, nanocone, nanohorn, nanorod, and can be used in diverse technical fields due to their various excellent properties.

Among them, particularly, carbon nanotube (CNT) is a material wherein carbon atoms are arranged in a hexagonal pattern in a tube shape, and has diameter of about 1 to 100 nm. The carbon nanotube shows non-conductive, conductive or semiconductive characteristics according to unique chirality; about 100 times higher tensile strength than steel due to carbon atoms connected by strong covalent bonds; excellent flexibility and elasticity; and chemical stability.

The carbon nanotube is classified into: a single-walled carbon nanotube (SWCNT) consisting of one sheet and having diameter of about 1 nm; double-walled carbon nanotube (DWCNT) consisting of two sheets and having diameter of about 1.4 to 3 nm; and multi-walled carbon nanotube (MWCNT) consisting of three or more sheet and having diameter of about 5 to 100 nm.

Due to its characteristics such as chemical stability, and excellent flexibility and elasticity, studies on its manufacturization and application of the carbon nanotube are in progress in various fields, for example, aerospace, fuel cell, composite material, biotechnology, medicine, electronics, and semiconductor. However, primary structure of the carbon nanotube has limit on directly controlling its diameter or length to the actual standard enough for industrial application. Accordingly, the carbon nanotube has many limits on industrial adaptation or application despite of its excellent properties.

In order to more diversify the roles of the carbon nanostructure such as the carbon nanotube as a structure reinforcement member and a chemical functional body, a method collectively forming a primary structure of the carbon nanostructures on a flat substrate followed by physically growing thereof through a separate spinning process has been used [Zhang, X.; Li, Q.; Tu, Y.; Li, Y.; Coulter, J. Y.; Zheng, L.; Zhao, Y.; Jia, Q.; Peterson, D. E.; Zhu, Y. Small, 2007, 3, 244]. However, this previous method needs a secondary spinning process after flat-type growth, thereby its productivity is very low. The carbon nanotube yarn produced by this process has multi-layered structure grown as a flat-type as shown in FIG. 1 [Adv. Mater. Vol. 22, 2010, pages 692-696(2009, Nov. 24)]

In addition, methods for manufacturing carbon nanotube bundles having various structures and sizes have been reported, and the structures manufactured by the methods are shown in FIG. 2 [(a) Jia, Y.; He, L.; Kong, L.; Liu, J.; Guo, Z.; Meng, F.; Luo, T.; Li, M.; Liu, J. Carbon, 2009, 47, 1652; (b) Zhang, X.; Cao, A.; Li, Y.; Xu, C.; Liang, J.; Wu, D.; Wei, B. Chem. Phys. Lett., 2002, 351, 183; (c) Kathyayini, H.; Willems, I.; Fonseca, A.; Nagy, J. B.; Nagaraju, N. Cat. Commun., 2006, 7, 140; (d) Li, Y.; Zhang, X. B.; Tao, X. Y.; Xu, J. M.; Huang, W. Z.; Luo, J. H.; Luo, Z. Q.; Li, T.; Liu, F.; Bao, Y.; Geise, H. J. Carbon, 2005, 43, 295]. The structures in FIG. 2 are different in individual shape and size, but are similar in that they are not a hollow type but a closely packed type.

In nano-chemistry, the hollow type structure has many advantages. Accordingly, if the hollow type structure can be formed by using the carbon nanostructure having excellent chemical stability, elasticity and flexibility, its utilization will more and more increase.

SUMMARY OF THE INVENTION

Accordingly, it is an object of the present invention to provide a novel secondary structure of carbon nanostructures (CNSs), a bundle thereof and a composite comprising the same, which can be effectively applied to fields of energy materials, functional composites, batteries, semiconductors and the like, which require more diverse standards such as diameter, length and the like.

In order to accomplish one object of the present invention, the present invention provides a secondary structure of carbon nanostructures formed by a plurality of carbon nanostructures assembled in a tube form in whole or in part.

According to one preferable embodiment of the present invention, the secondary structure of carbon nanostructures may be a tangled structure, which is formed by a plurality of carbon nanostructures tangled one another.

According to one preferable embodiment of the present invention, effective internal diameter of the tube form of the secondary structure of carbon nanostructures can be diameter when contrast ratio of an electron microscopic image, taken in the direction of tube diameter, is 90%.

According to one preferable embodiment of the present invention, the contrast ratio can be calculated by digital image processing using MATLAB.

According to one preferable embodiment of the present invention, the carbon nanostructure may be a carbon nanotube, a carbon nanorod, a carbon nanohair or a carbon nanofiber, and particularly, it is preferred to be the carbon nanotube.

According to one preferable embodiment of the present invention, the carbon nanostructure may be 0.1 to 200 nm in diameter and 1 μm to 10 mm in length.

According to one preferable embodiment of the present invention, the secondary structure of carbon nanostructures may be in the form of a tube, and may be 0.1 to 30 μm in effective internal diameter, 1 to 100 μm in external diameter and 5 to 10000 μm in length.

According to one preferable embodiment of the present invention, the carbon nanotube may be composed of a single-walled carbon nanotube (SWCNT), a double-walled carbon nanotube (DWCNT), a multi-walled carbon nanotube (MWCNT) or any combination thereof.

According to one preferable embodiment of the present invention, the carbon nanotube can comprise the double-walled carbon nanotube (DWCNT) in an amount of 10 wt % or less.

Further, the present invention provides a bundle of secondary structures formed by the secondary structures assembled in the three-dimensional form.

Further, the present invention provides a composite comprising the secondary structures or the bundle of secondary structures.

According to another embodiment of the present invention, the present invention provides a method for manufacturing the secondary structure of carbon nanostructures, which comprises the step of reacting a reaction gas comprising a carbon source in the presence of a supported catalyst obtained by impregnating a catalyst metal to a milling processed support followed by crushing and calcining thereof.

According to one preferable embodiment of the present invention, particle size ($d_{50}$) of the milling processed support may be 0.1 to 1.5 µm.

According to one preferable embodiment of the present invention, the milling processed support may be an aluminum-based support.

According to one preferable embodiment of the present invention, the catalyst metal can comprise cobalt (Co) and molybdenum (Mo).

ADVANTAGEOUS EFFECTS OF THE INVENTION

The CNS secondary structure and the bundle form by assembling thereof according to the present invention are novel, and the secondary structure can show novel characteristics. Accordingly, this can be applied to various fields of energy materials, functional composites, batteries, semiconductors and the like.

BRIEF DESCRIPTION OF DRAWINGS

The above and other objects and features of the present invention will become apparent from the following description of the invention taken in conjunction with the following accompanying drawings, which respectively show:

FIG. 13b is an enlarged SEM image of part A of FIG. 13a; and

DESCRIPTION OF SYMBOLS

Figure 1:
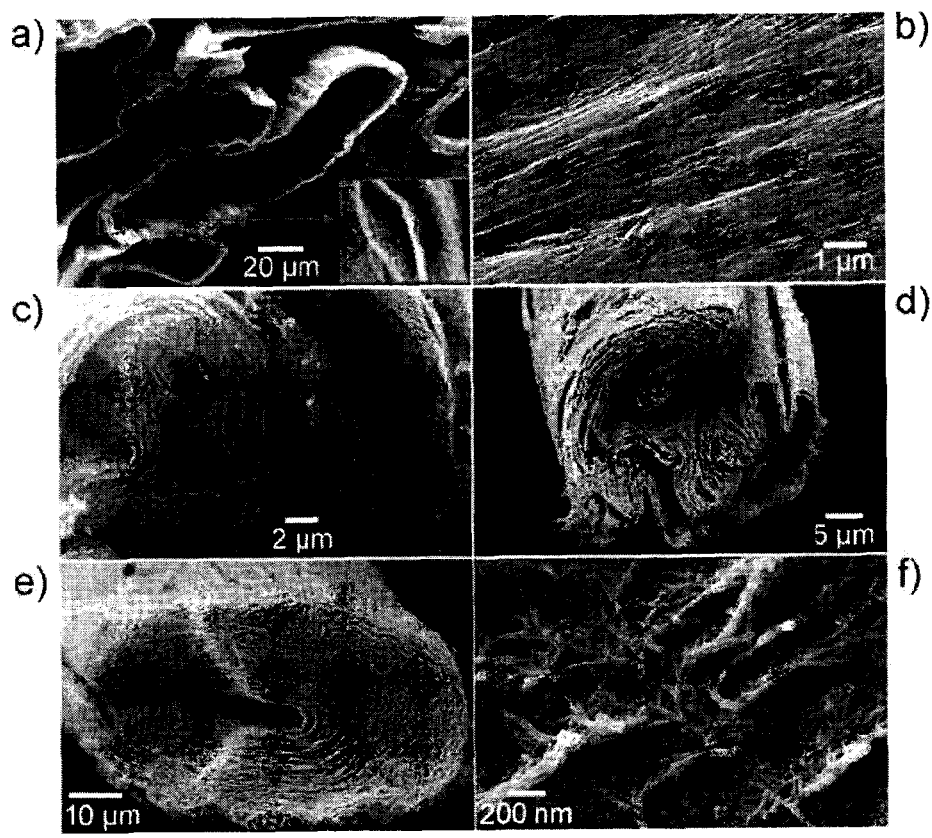
FIG. 1: SEM images of the CNT yarn manufactured according to prior art.
Figure 2:
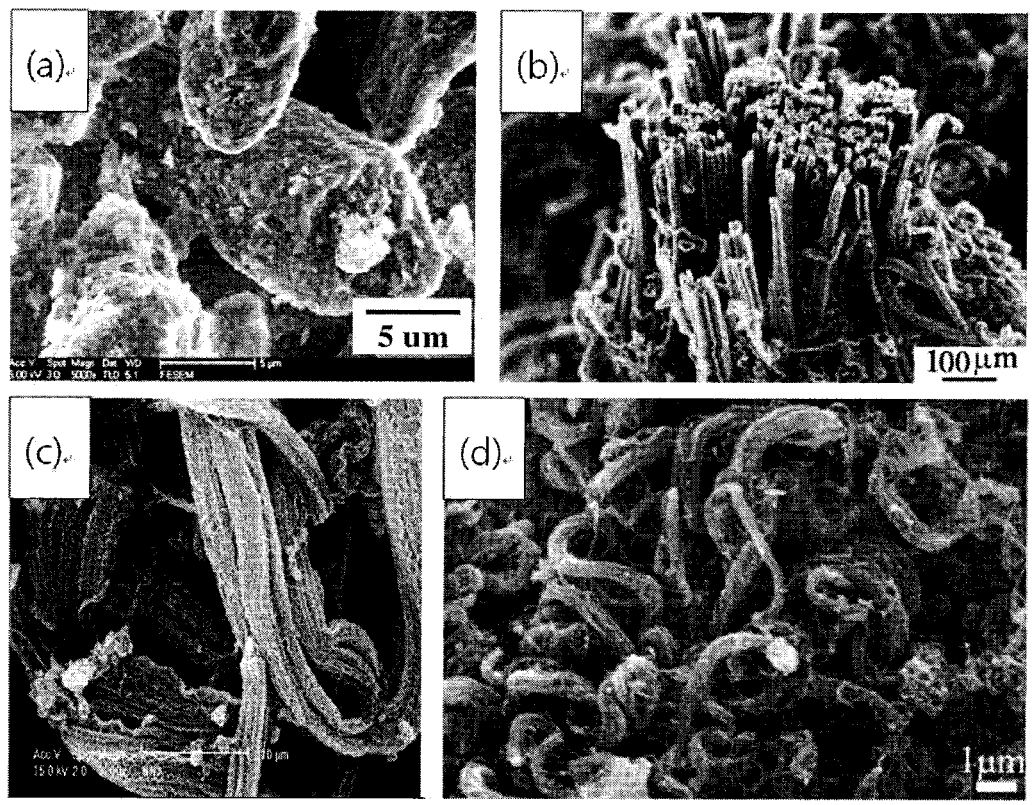
FIG. 2: SEM images of the CNT secondary structure manufactured according to prior art.

100: Supported catalyst surface
200: CNS secondary structure bundle
301: Center part of secondary structure
302: Outer part of secondary structure
311: One end contacted with catalyst surface of secondary structure
312: Other end toward outside of CNS secondary structure
300: CNS secondary structure
400: CNS

DETAILED DESCRIPTION OF THE INVENTION

Hereinafter, the CNS secondary structure according the present invention, the bundle thereof and the composite comprising the CNS secondary structures or the bundles of the CNS secondary structures will be described in detail.

The CNS secondary structure according to the present invention is a structure formed by a plurality of CNS objects assembled to have a tube form in whole or in part.

Herein, the 'tube form' means that the form, which looks like its center part is empty (hollow or pore) due to lower density of the CNS objects in the center part than the outer part but whose length is longer than diameter of the secondary structure. Herein, 'diameter of tube' means 'external diameter of tube' unless otherwise indicated.

Cross section of the tube form may be circular and also comprise hollow or pore in the form of oval or somewhat distorted oval, and the hollow or pore may comprise all forms, which can be recognized as circle or oval to those skilled in the art. The hollow or pore is formed due to much lower distribution density of the carbon nanostructure than the outer part. Accordingly, it is hard to say that it has a well-defined boundary.

Accordingly, in the present invention, when the shape of the hollow or pore on the cross section is regarded as a circle having the area corresponding thereto, diameter of the circle is defined as 'effective internal diameter' of the tube. The effective internal diameter may be diameter when contrast ratio of an electron microscope image of the cross section of the tube formed by the secondary structure of carbon nanostructures is at a certain level, for example, when the contrast ratio is 90%.

On the other hand, the CNS secondary structure may be getting thicker or thinner along the direction where the CNS comprising thereof was grown from a supported catalyst, i.e., longitudinal direction, and therefore, the diameters of the center part and the outer part thereof may be getting thicker or thinner along the longitudinal direction.

The CNS secondary structure bundle according to another embodiment of the present invention is formed by the CNS secondary structures, having a tube form in whole or in part, tangled one another to form three-dimensional shape. The overall form of the CNS secondary structure bundle is diverse, and for example, it may be a spherical form, a spheroidal form, a cylindrical form, a conical form or a truncated conical form, but not limited thereto.

Thickness at the thickest part of the CNS secondary structure bundle may be from several micrometers (μm) to several thousand micrometers, and for example, it may be 2 to 2,000 μm. Further, when excluding the supported catalyst, length of the CNS secondary structure bundle may be from several micrometers to several thousand micrometers based on the direction of CNS secondary structure bundle growth, and for example, it may be 5 to 1,000 μm.

The composite according to another embodiment of the present invention may be a composite, wherein the CNS secondary structures or the CNS secondary structure bundles are dispersed in a matrix. For example, the composite may be a composite formed by dispersing the CNS secondary structure particles in a polymer matrix by melt-mixing the polymer and the CNS secondary structures. The raw material of the matrix is not particularly limited, but it may be polymer, metal, ceramic or a mixture thereof.

Hereinafter, the CNS secondary structure and the CNS secondary structure bundle will be described in detail with reference to FIGS. 3, 4 and 5.

Figure 3:
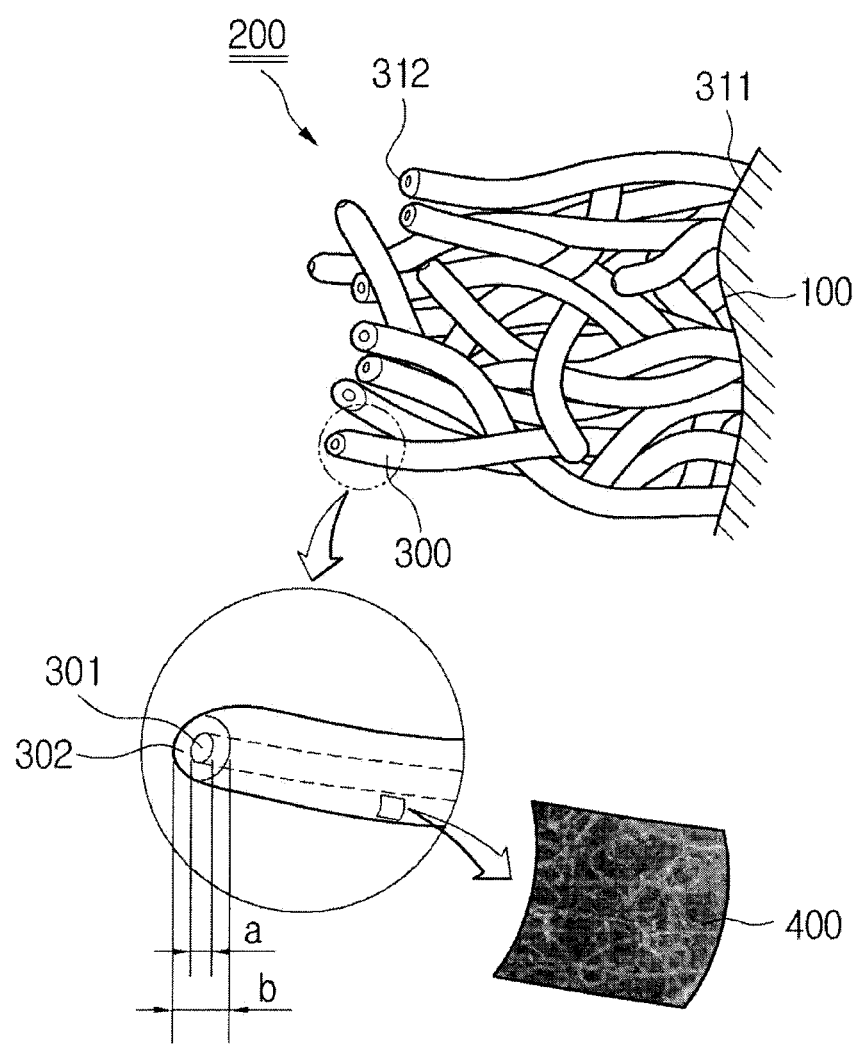
FIG. 3 is a mimetic diagram of the CNS secondary structure bundle according to one embodiment of the present invention, and an enlarged mimetic diagram of the CNS secondary structure contained therein.

FIG. 3 is a drawing mimetically illustrating the CNS secondary structure formed according one embodiment of the present invention and the bundle thereof. In FIG. 3, the symbol 100 refers to a supported catalyst used for CNS synthesis, the symbol 200 refers to a CNS secondary structure bundle, the symbol 300 refers to a CNS secondary structure, and the symbol 400 refers to a CNS.

As shown in FIG. 3, the CNS secondary structure bundle 200 or the CNS secondary structure 300 manufactured according to one embodiment of the present invention can exist with the supported catalyst 100, and although not illustrated as a drawing, it is obvious to those of ordinary skill in the art that it also can exist independently by being separated from the supported catalyst 100 by post-treatment and the like.

As shown in FIG. 3, the CNS secondary structure bundle 200 is formed by dense assembling of a plurality of CNS secondary structures 300, and a part of the CNS secondary structures may randomly get tangled.

In one embodiment of the present invention, the CNS secondary structure bundle can be formed by assembling of the new type hollow CNS secondary structures according to the present invention, or can be formed by assembling the hollow CNS secondary structures according to the present invention together with the conventional CNS secondary structure, wherein the insides thereof are fully filled.

The CNS secondary structure bundle of the present invention can be formed to comprise the hollow CNS secondary structures according to the present invention in an amount of 10% or more, 30% or more, 50% or more, or 80% or more, based on the entire number of the CNS secondary structures in the CNS secondary structure bundle.

In FIG. 3, the CNS secondary structure 300 forming the CNS secondary structure bundle 200 is a structure formed by random assembling or tangle of a plurality of the CNSs 400, which are grown together on the supported catalyst 100 (tangled structure), and it is in the form of a tube, which is grown long to approximately one direction. More specifically, as shown in FIG. 3, the CNS secondary structure 300 is a structure, wherein one end 311 thereof is connected to the supported catalyst 100, and length from the end 311 to the other end 312 is approximately 5 to 10,000 μm, and formed by random assembling and tangle of a plurality of the CNSs 400.

The circle in FIG. 3 show the enlarged CNS secondary structure 300 forming the CNS secondary structure bundle 200. When looking at this, it can be found that the CNS secondary structure 300 is composed of a hollow center part 301 and a tube-type outer part 302 covering the center part 301.

Figure 4:
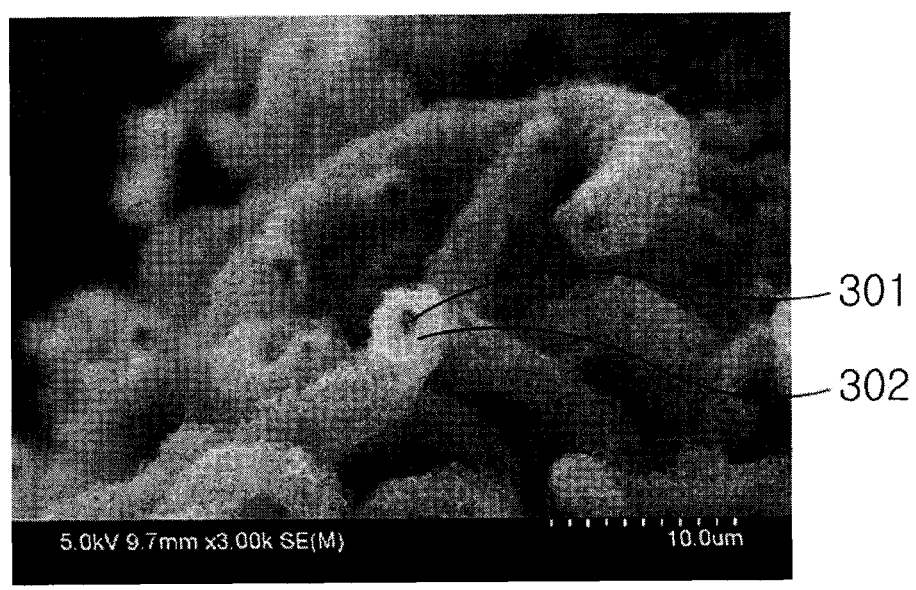
FIG. 4 is an SEM image of the CNS secondary structure according to one embodiment of the present invention indicating the center part 301 and the outer part 302 of the CNS secondary structure.
Figure 5:
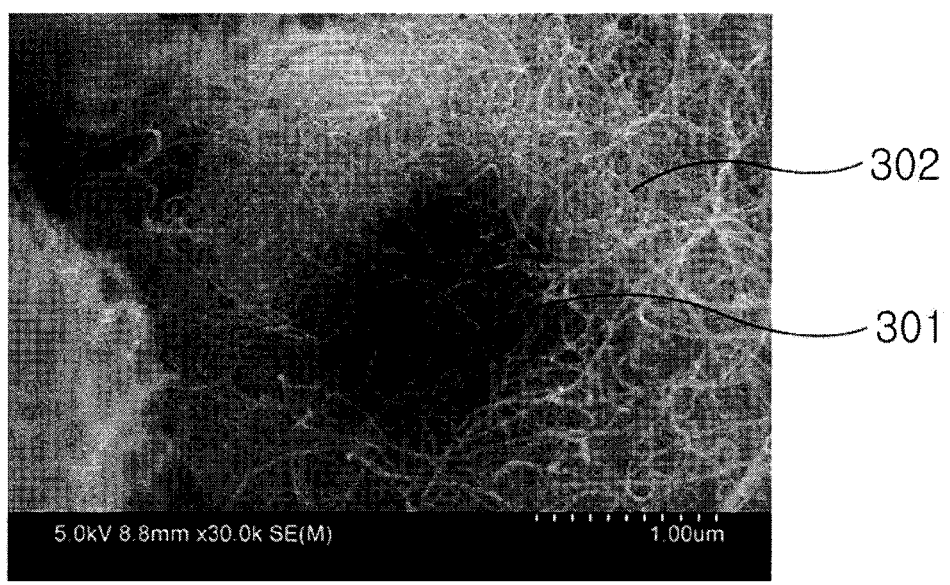
FIG. 5 is an SEM image of one side of the CNS secondary structure according to one embodiment of the present invention.

FIG. 4 is an SEM image of the CNS secondary structure according to one embodiment of the present invention indicating the center part 301 and the outer part 302 of the CNS secondary structure, and FIG. 5 is an enlarged image of a part of FIG. 4. In one embodiment of the present invention, the center part 301 of the CNS secondary structure 300 may refer to a part, in which the distribution density of the CNS 400 existing therein is relatively lower than the distribution density of the CNS existing at the outer part 302. For example, the CNS distribution density of the center part 301 is approximately 1/3 or less, 1/4 or less, or 1/5 or less against the CNS distribution density of the outer part 302.

The lower CNS distribution density at the center part means that the center part is actually empty. Specifically, the fact that the space corresponding to the center part is empty can mean that 70% or more of the corresponding space is empty even though the CNSs 400 actually exist. For example, when looking at FIGS. 4 and 5, the dark parts in the SEM images are the center parts 301, and the reason the center parts are seemed dark is lower amount of the CNS objects existing therein. Approximately, the area occupied by the CNS objects at the center part 301 is less than 30% of the center part 301 area. Further, in one embodiment, the fact that the peace corresponding to the center part is empty can mean that 80% or more, or 90% or more of the corresponding space is empty even through the CNSs actually exist.

Accordingly, the part, in which the CNSs 400 are not exist or its distribution is insignificant although it exist, forms the center part 301 of the CNS secondary structure 300, and its secondary structure is in the form of a tube in whole or in part because it is approximately consisting of a cylindrical hollow or pore. Diameter of the cylindrical pore, i.e., internal diameter of the tube shape or effective internal diameter (a) may be approximately 0.1 to 30 μm, 0.5 to 9 μm, 0.5 to 3 μm, 0.5 to 2 μm, or 0.5 to 1.5 μm.

According to one embodiment of the present invention, the effective internal diameter (a) can be measured by using Matlab-Image Processing Toolbox ["Digital Image Processing Using MATLAB", by Rafael C. Gonzalez, et al., translated by Yoo Hyeon Joong, McGraw-Hill Korea, 2012, page 509)].

Figure 6:
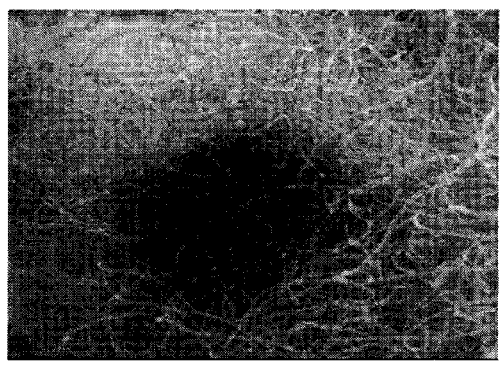
FIG. 6 is an image for explaining the method measuring effective internal diameter of the CNS secondary structure using MATLAB-IPT.
Figure 6:
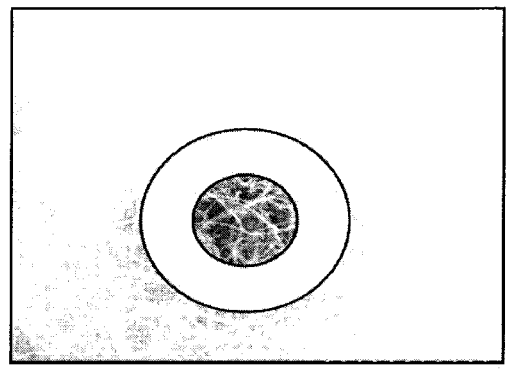

Specifically, with reference to FIG. 6, an electron microscope image like FIG. 6 (a) is converted to a state of giving more clear black and white contrast ratio like (b) as a virtual corresponding structure having ideal circle, which can be mathematically interpreted, through a data input and conversion processes of the image process. A circle having random radius was defined at the center of the black part of the image, and the image was digitalized by the number of black and white pixels using space-dividing function of image process software followed by measuring the ratio thereof.

For example, if the number of black and white pixels (contrast ratio) according to radius of the circle calculated by the said method is as listed in the following Table 1, the certain value of the contrast ratio can be determined as the effective internal diameter of the CNS secondary structure (for example, 3.4 μm when the contrast ratio is 90%).

TABLE 1

| Radius (μm) | Number of Black and White Pixels (Contrast Ratio) |
| --- | --- |
| 0 | 98.9 |
| 0.5 | 96.6 |
| 1 | 94.8 |
| 1.5 | 93.2 |
| 2 | 6.4 |
| 2.5 | 1.9 |
| 3 | 1.1 |

Like this, the CNS secondary structure according to the present invention is a novel secondary structure not in the conventional structure at the point that it is a tube form, which has the effective internal diameter.

In one embodiment, length of the CNS secondary structure may be, for example, 5 to 10,000 μm, 15 to 1,000 μm, or 20 to 500 μm.

Further, in one embodiment, diameter of the CNS secondary structure, i.e., outer diameter of the tube form (symbol "b" in FIG. 3) may be approximately 1 to 100 μm, 1 to 30 μm, 1 to 10 μm, 2 to 9 μm, or 3 to 8 μm. The external diameter means diameter of a circle forming the outmost part of the tube form.

According to one embodiment of the present invention, thickness of the CNS secondary structure, i.e., size excluding the internal diameter of the CNS secondary structure from the external diameter thereof, may be approximately 0.5 to 99.5 μm, 0.5 to 29.5 μm, 0.5 to 9.5 μm, or 1 to 8 μm.

CNS distribution density at the outer part and the center part of the CNS secondary structure can be measured by using the area occupied by the CNS objects per unit area to the direction perpendicular to the longitudinal direction of the CNS secondary structure, i.e., the diameter direction of the tube form. The unit area may be, for example, 10 nm$^2$.

As another method, the CNS distribution density can be measured by sequentially measuring the contrast ratio of the SEM image from the center part inside of the bundle to the direction of certain diameter increase and converting change of primary function for change according to progress of the contrast ratio to the diameter direction to density function for one side of the bundle by using Matlab-Image Processing Toolbox and Curve Fitting Toolbox ["Digital Image Processing Using MATLAB", by Rafael C. Gonzalez, et al., translated by Yoo Hyeon Joong, McGraw-Hill Korea, 2012, page 509)].

In FIG. 3, symbol 400 is an enlarged SEM image of a part of the surface of the CNS secondary structure 300, and when looking at this, it can be found that the CNSs 400 are closely tangled to form the CNS secondary structure 300. The CNS may be preferably a CNT, and the CNT may be a single-walled carbon nanotube (SWCNT), a double-walled carbon nanotube (DWCNT), a multi-walled carbon nanotube (MWCNT) or any combination thereof, and for specific example, it may be the multi-walled carbon nanotube (MWCNT).

In one embodiment, length of the CNS 400 may be, for example, 1 μm to 10 mm, or 1 μm to 1 mm, and diameter of the CNS 400 may be 0.1 to 200 nm, or 2 to 100 nm.

In one embodiment of the present invention, the CNS 400 may be the CNS comprising the single-walled carbon nanotube (SWCNT) in an amount of 10 wt % or less, or the CNS comprising the single-walled carbon nanotube (SWCNT) in an amount of 0.000001 to 10 wt %.

In another embodiment of the present invention, the CNS 400 may be the CNS comprising the double-walled carbon nanotube (DWCNT) in an amount of 10 wt % or less, or the CNS comprising the double-walled carbon nanotube (DWCNT) in an amount of 0.0000001 to 10 wt %.

According to another embodiment of the present invention, because the CNS distribution density is largely changed on the border of the center part and the outer part, the part, where the CNS distribution density is the most largely changed from the center part of the CNS secondary structure to the outer wall, may be the border of the center part and the outer part, when the distribution density of the CNS irregularly protruded from the major cylinder form of the CNS secondary structure is not considered.

Hereinafter, the method for manufacturing the CNS secondary structure according to the present invention and the bundle thereof will be described in detail. In the following description, facts and skills well-known to those of ordinary skill in the art are omitted.

The CNS secondary structure according to the present invention can be manufactured by reacting reaction gas comprising a carbon source in the presence of a supported catalyst obtained by impregnating a catalyst metal to a milling processed support followed by crushing and calcining thereof.

According to one embodiment of the present invention, it can be manufactured by chemical vapor deposition (CVD) using the catalyst for manufacturing CNS, which is obtained by impregnating active metal to the milling processed support, preferably an aluminum-based support followed by calcining thereof.

In order to manufacture the CNS secondary structures having a tube shape, wherein a hollow or pore is formed in the center part thereof, as described above or the CNS secondary structure bundle consisting thereof, the support where the active metal will be impregnated, can be milling processed.

According to one embodiment of the present invention, the milling process may be ball-milling, and can be conducted at the condition of 100 rpm or more, 100 to 1,000 rpm, or 150 to 500 rpm.

According to one preferable embodiment of the present invention, the support may be milling processed AlO(OH), Al(OH)$_3$ or Al$_2$O$_3$. The milling processed AlO(OH), Al(OH)$_3$ and Al$_2$O$_3$ may has particle size (d$_{50}$) of 0.1 to 1.5 μm, more preferably 0.15 to 0.6 μm, and the most preferably 0.2 to 0.4 μm. Within the said range, the CNS secondary structure according to the present invention can produced in high content.

The particle size (d$_{50}$) of AlO(OH) before the milling process may be, for specific example, 1 to 100 μm, more preferably 3 to 60 μm. Further, surface area of AlO(OH) before the milling process may be 10 to 1,000 m$^2$/g, or 50 to 600 m$^2$/g. And pore volume of AlO(OH) before the milling process may be 0.1 to 2 mL/g, or 0.2 to 1.5 mL/g.

The particle size (d$_{50}$) of Al(OH)$_3$ before the milling process may be, for specific example, 10 to 80 μm, or 20 to 60 μm. Further, the particle size (d$_{50}$) of Al$_2$O$_3$ before the milling process may be, for specific example, 10 to 100 μm, or 20 to 80 μm.

According to one embodiment of the present invention, the catalyst metal may be Mo metal and Co metal, but not limited thereto.

Molar ratio of the Mo metal and the Co metal (Mo/Co) may be more than 0 to less than 1, preferably 1/20 to 1/2.5, more preferably 1/10 to 1/2.5, the most preferably 1/6 to 1/4, and the CNS secondary structure having clear pore at the center part can be formed because difference between the distribution densities of the center part and the outer part of the CNS secondary structure manufactured within this range is large. By controlling the molar ratio of the Mo metal and the Co metal (Mo/Co), the CNS secondary structure having desired length can be obtained.

According to one embodiment of the present invention, temperature for calcining may be more than 200° C. to less than 800° C., 400 to 675° C., 550 to 650° C., or 600 to 650° C., and within this range, the CNS secondary structure of the present invention having a pore as the center part can produced in high content.

In addition, the new-type CNS secondary structure bundle according to the present invention has effect that post-treatment processes such as a process cutting out the CNS secondary structure is easy, and dispersibility is excellent when manufacturing polymer composites and solution-dispersion type products because the catalyst particle is formed as protruding to exterior space.

Hereinafter, the present invention is explained by the following examples in more detail. The following examples are intended to further illustrate the present invention. Accordingly, those of ordinary skill in the art will recognize that various changes and modifications of the embodiments described herein can be made without departing from the scope and spirit of the invention.

EXAMPLE

Hereinafter, Examples will be described with the example of manufacturing a carbon nanotube (CNT) as a carbon nanostructure (CNS).

Example 1

Synthesis of AlO(OH)

Al(O-sec-Bu)$_3$ 50 g was mixed with EtOH 25 ml, and stirred at 120° C. for 30 min, and then distilled water 15 ml was added thereto followed by cooling to room temperature. The cooled product was filtered using a glass filter to obtain precipitate, and the precipitate was washed with acetone several times, and then dried at 120° C. for 3 hrs to obtain AlO(OH).

<Preparation of Support>

The synthesized AlO(OH) was ball-milled using a zirconia ball at 200 to 250 rpm. The milling processed AlO(OH) support was 0.3 μm in particle size (d$_{50}$).

<Preparation of Supported Catalyst from AlO(OH)>

Co(NO$_3$)$_2$.6H$_2$O 870 mg and (NH$_4$)$_6$Mo$_7$O$_{24}$ 120 mg were completely dissolved in distilled water 50 ml, and then the milling processed AlO(OH) 1.0 g was added thereto followed by mixing at 60° C., 85 mb for 30 min and then at 10 mb for 30 min to obtain a supported catalyst precursor in solid phase. The obtained supported catalyst precursor was dried at 120° C. for 1 hr, crushed and calcined at 600° C. for 4 hrs to obtain a supported catalyst 1.12 g.

<Synthesis of CNT Secondary Structure>

The prepared supported catalyst 2 mg was installed at the center part of a quartz tube having internal diameter of 55 mm in a fixed bed apparatus of laboratory scale, and then heated to 700° C. under nitrogen atmosphere and kept. Synthesis reaction was conducted as let flow nitrogen gas (N$_2$), hydrogen gas (H$_2$) and ethylene gas (C$_2$H$_4$) at the volume mixing ratio of 1:1:1 for 1 hr, and therefore, CNT secondary structures and a CNT secondary structure bundle consisting thereof were manufactured in the reaction yield of 2,254%.

The reaction yield was calculated by the following mathematical formula I.

Reaction Yield (%)=[(Total weight after reaction−Weight of the used catalyst)/Weight of the used catalyst]×100  [Mathematical Formula I]

Figure 7:
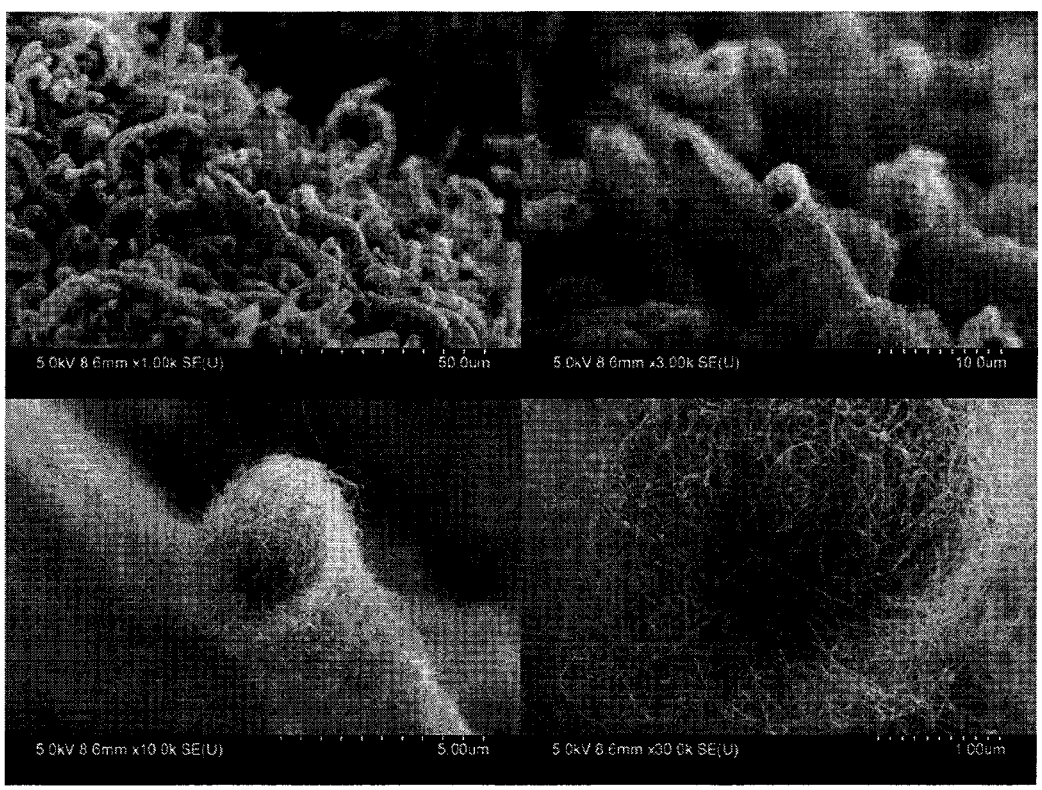
FIG. 7 is SEM images of the CNT secondary structure bundle manufactured according to Example 1.

SEM images of the CNT secondary structure bundle manufactured as described above were illustrated in FIG. 7. As shown in FIG. 7, it was confirmed that: the manufactured CNT secondary structure bundle was made of a plurality of CNT secondary structures; and each CNT secondary structure is in the form of a tube comprising a center part, which is a pore, and an outer part surrounding thereof.

Examples 2 and 3

Preparation of Support

Al(OH)$_3$ and gamma-Al$_2$O$_3$, which were heat-treated at 400° C., were ball-milled using a zirconia ball at 200 to 250 rpm, respectively. The milling-processed Al(OH)$_3$ support and gamma-Al$_2$O$_3$ were 0.250 μm and 0.265 μm in particle diameter (d$_{50}$), respectively.

<Preparation of Supported Catalyst>

The procedure of Example 1 was repeated except for using the milling-processed Al(OH)$_3$ and gamma-Al$_2$O$_3$, respectively (Example 2 and 3 in order), instead of using the AlO(OH), and therefore, 1.1 g and 1.2 g of supported catalysts were prepared.

<Synthesis of CNT Secondary Structure>

The procedure of Example 1 was repeated except for using a different supported catalyst to synthesize CNTs, and therefore CNT secondary structure bundles were manufactured in the reaction yields of 2,280% and 2,450%, respectively.

Figure 8:
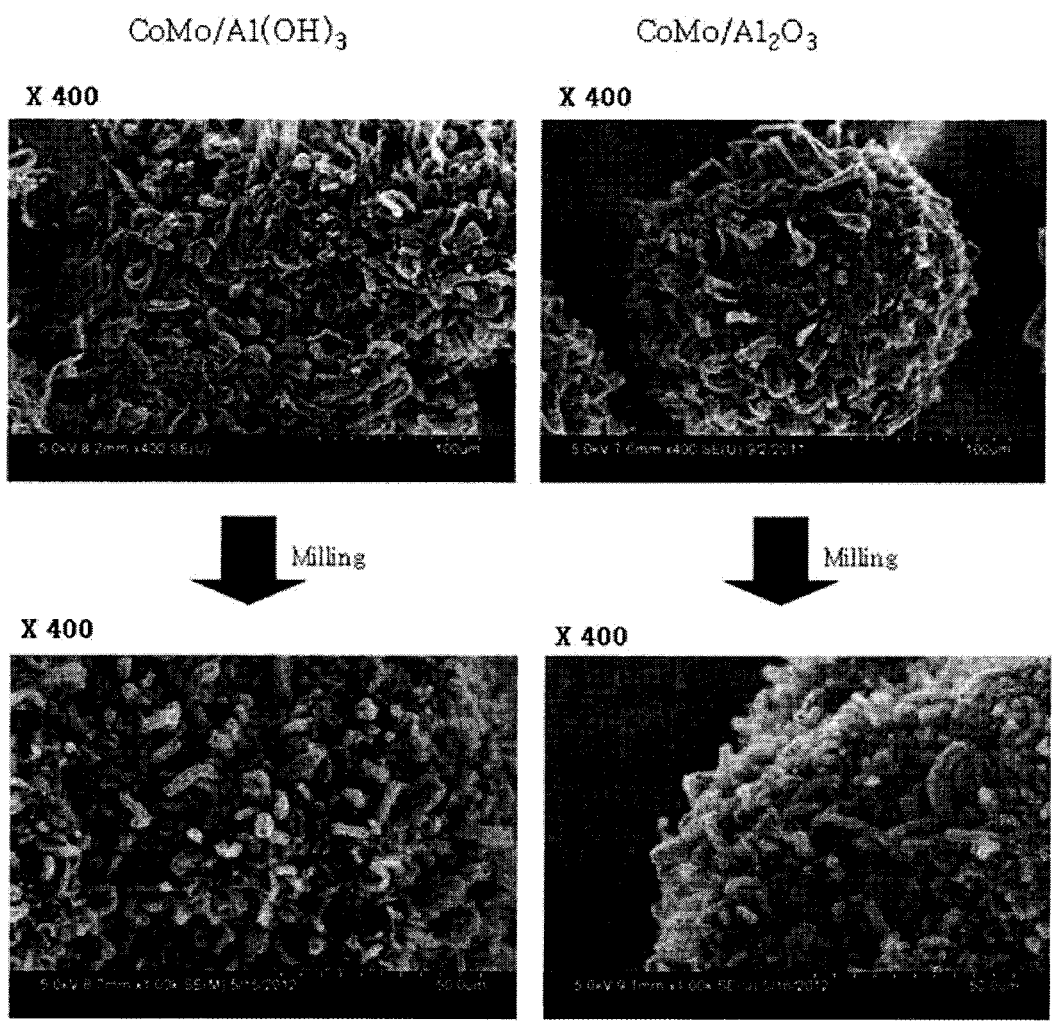
FIG. 8 is SEM images of the CNT secondary structure bundle manufactured according to Examples 2 and 3.

SEM images of each of the manufactured CNS secondary structure bundle were illustrated in FIG. 8.

As shown in FIG. 8, it was confirmed that the CNT secondary structure bundles manufactured by using the ball-milled Al(OH)$_3$ or gamma-Al$_2$O$_3$ as the support are new type bundles consisting of new type CNT secondary structures, in which pores as the center part are formed in the CNT secondary structures.

Examples 4 to 12

The procedure of Example 1 was repeated except for using each of the supported catalysts calcined at 300, 400, 500, 550, 625, 650, 675, 700 and 750° C., respectively to manufacture CNT secondary structure bundles in the reaction yields of 1,664%, 1,921%, 2,245%, 2,074%, 2,015%, 2,065%, 2,100%, 2,300% and 2,464%, respectively.

Figure 9:
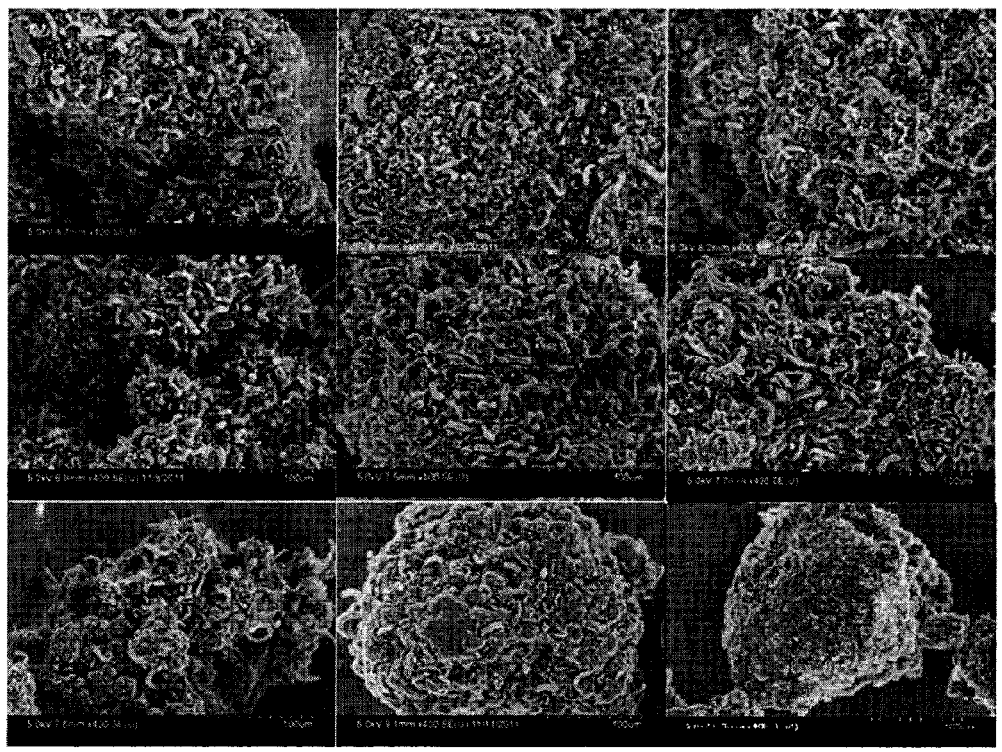
FIG. 9 is SEM images of the CNT secondary structure bundle manufactured according to Examples 4 to 12.

SEM images of each of the manufactured CNS secondary structure bundle were illustrated in FIG. 9.

As shown in FIG. 9, it was confirmed that the CNT secondary structure bundles manufactured are new type bundles consisting of new type CNT secondary structures, in which pores as the center part are formed in the CNT secondary structures.

Examples 13 to 16

The procedure of Example 1 was repeated except for using the supported catalysts, wherein the molar ratios of the supported Mo metal and the Co metal (Mo/Co) are 1/20, 1/10, 1/5 and 1/2.5, respectively, to manufacture CNT secondary structure bundles in the reaction yields of 357%, 790%, 2,029% and 1,444%, respectively.

Figure 10:
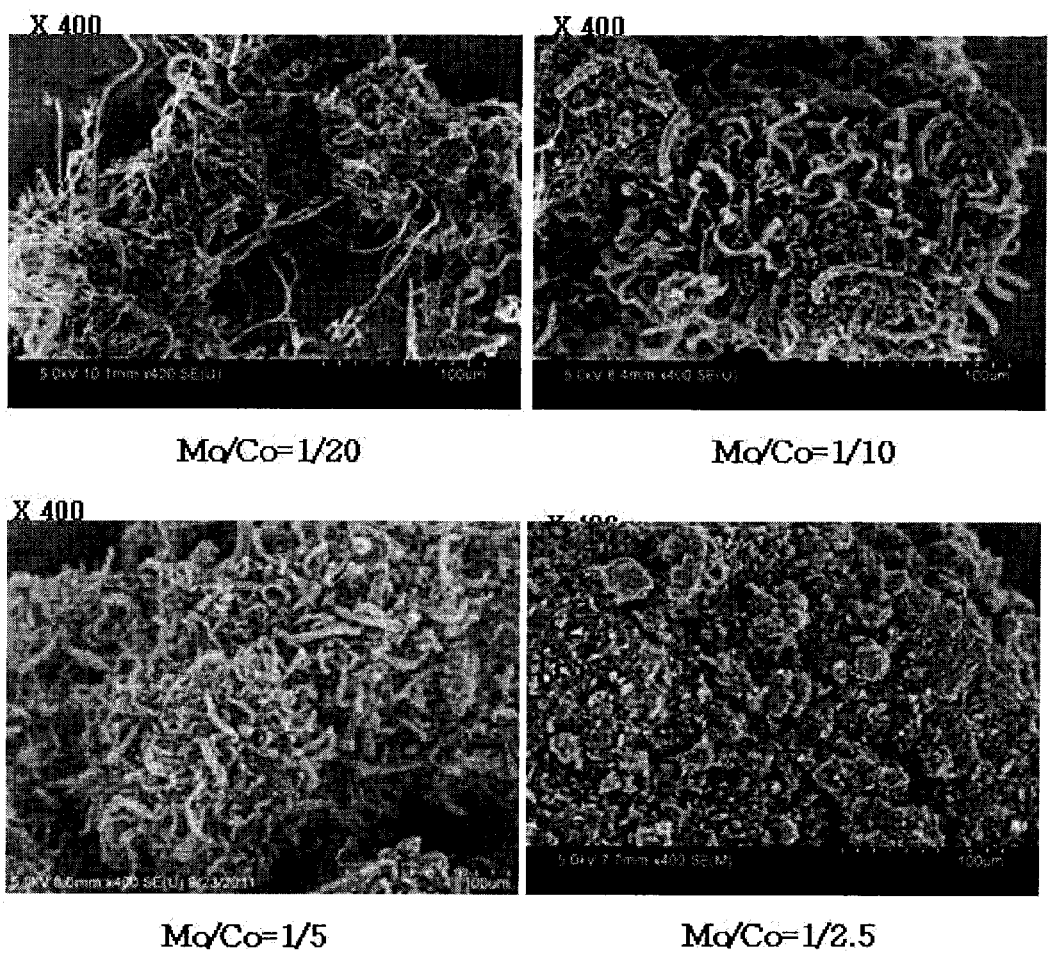
FIG. 10 is SEM images of the CNT secondary structure bundle manufactured according to Examples 13 to 16.

SEM images of each of the manufactured CNS secondary structure bundle were illustrated in FIG. 10.

As shown in FIG. 10, it was confirmed that the CNT secondary structure bundles manufactured are new type bundles consisting of new type CNT secondary structures, in which pores as the center part are formed in the CNT secondary structures. Particularly, it was confirmed that as the Mo/Co value of the supported catalyst increased, the pore as the center part of the manufactured CNT secondary structure became gradually clear, and when the supported catalyst having Mo/Co value of 1/5 was used (Example 15), the pore as the center part of the manufactured CNT secondary structure was shown the most clearly.

Comparative Examples 1 and 2

The procedure of Example 2 was repeated except for using the Al(OH)$_3$ and gamma-Al$_2$O$_3$ which did not ball-milled, respectively, to manufacture CNT secondary structure bundles in the reaction yields of 1,463% and 480%, respectively. SEM images of each of the manufactured CNS secondary structure bundle were illustrated in FIG. 11.

Figure 11:
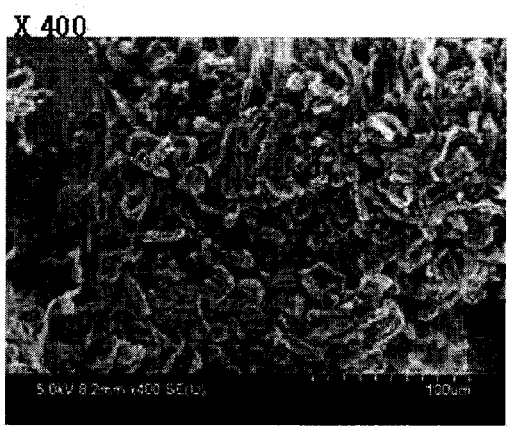
FIG. 11 is SEM images of the CNT secondary structure bundle manufactured according to Comparative Examples 1 and 2.
Figure 11:
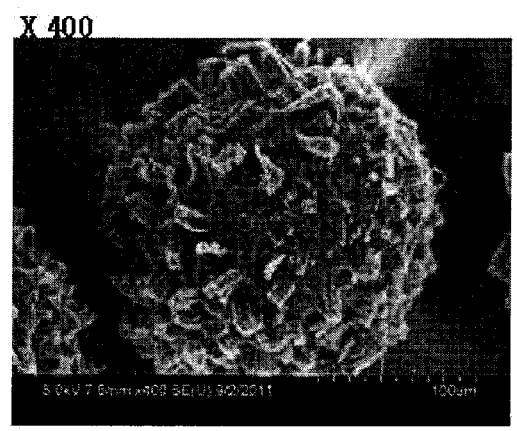

As shown in FIG. 11, it was confirmed that: in the case of the CNT secondary structure bundle manufactured by using the Al(OH)$_3$ as a catalyst support (Comparative Example 1), relatively small bundle was observed, and it was the conventional type, wherein the center part of the CNT secondary structure was filled; in the case of the CNT secondary structure bundle manufactured by using the gamma-Al$_2$O$_3$ as a catalyst support (Comparative Example 2), small bundle was observed, and it was also the conventional type, wherein inside of the CNT secondary structure was fully filled (thick bundle).

As shown in FIG. 4 to FIG. 10, it was confirmed that the CNT secondary structures of the present invention (Examples 1 to 16) are new type, wherein the center parts thereof were empty unlike the conventional CNT secondary structures (Comparative Examples 1 and 2).

To the CNT secondary structures of Examples 1, 7 and 8, internal diameters measured at contrast ratio of 90% by MATLAB-IPT, external diameters and lengths by SEM observation were as follows.

TABLE 2

| Section | Effective Internal diameter | External diameter | Length |
| --- | --- | --- | --- |
| Example 1 | 1.2 µm | 2.5~4 µm | 30~60 µm |
| Example 7 | 1.1 µm | 2.3~3.5 µm | 20~40 µm |
| Example 8 | 1.3 µm | 2.5~3.7 µm | 20~40 µm |

Observation of Initial Growth of CNT Secondary Structure

Figure 12A:
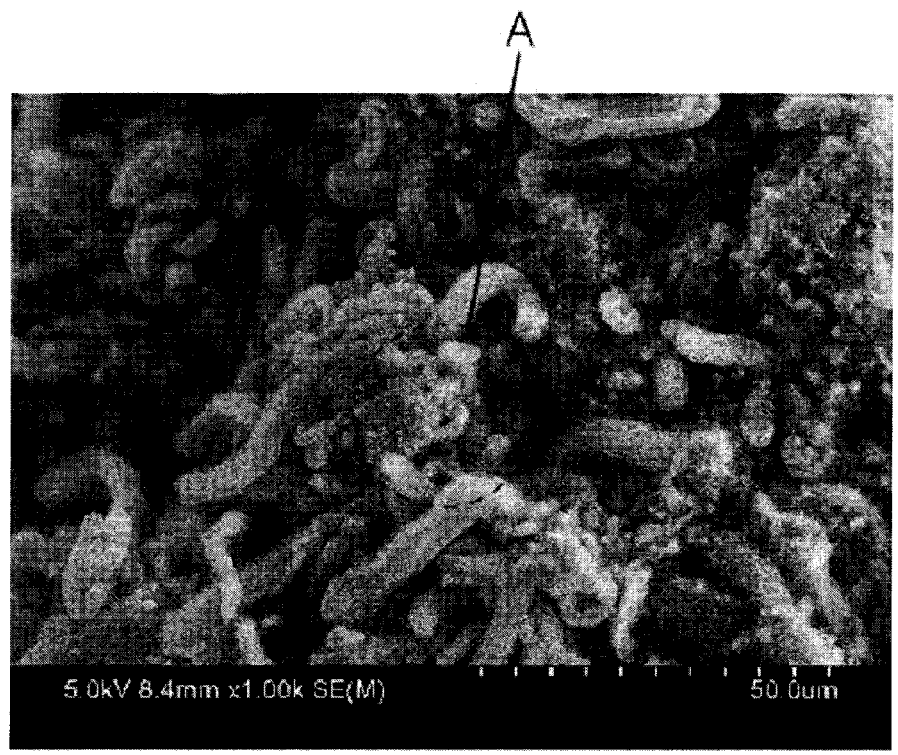
FIG. 12a is an SEM image of the secondary structure bundle in the initial stage of growth according to Example 1 of the present invention.
Figure 12B:
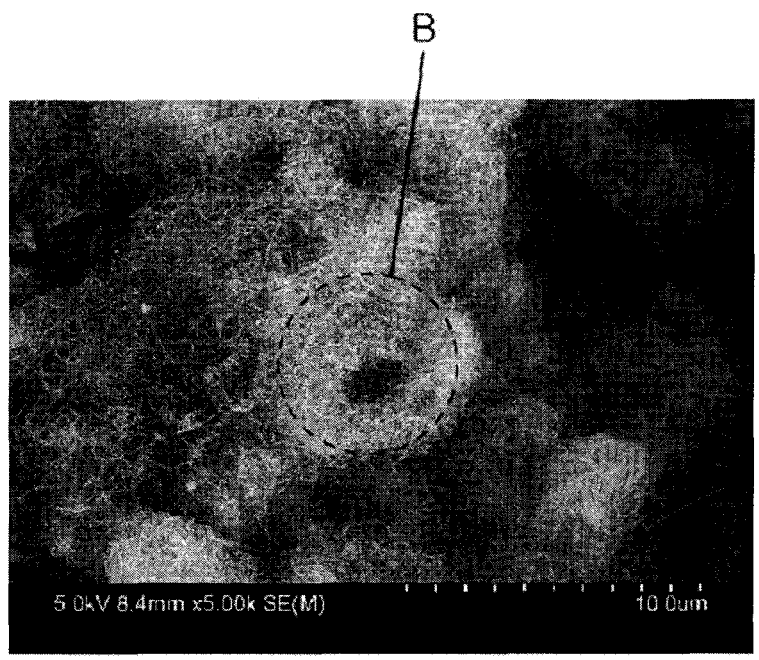
FIG. 12b is an enlarged SEM image of part A of FIG. 12a (CNT secondary structure)
Figure 12C:
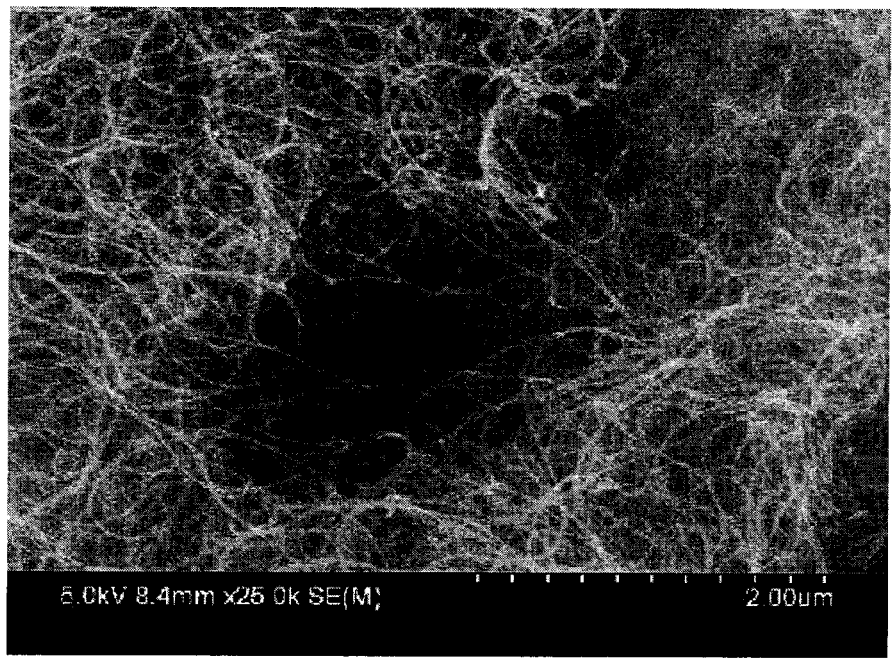
FIG. 12c is an enlarged SEM image of part B of FIG. 12b (one side of the CNT secondary structure)

As shown in FIGS. 12a to 12c, it was confirmed that, in the CNT secondary structure according to Example 1, the pores as the center part were formed even in the CNT secondary structure having length of 10 µm or less, which was in the initial growth stage before complete growth. From this, it can be found that, in the new type CNT secondary structure, the pore as the center part was empty through all the way from one end of the secondary structure to the other end thereof.

Figure 13A:
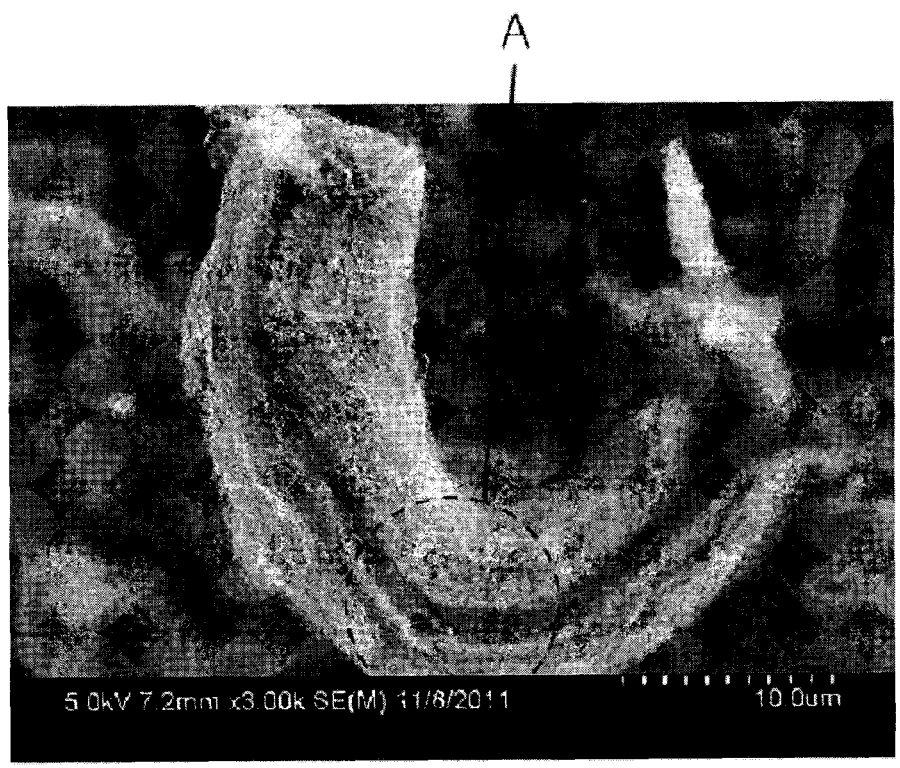
FIG. 13a is an SEM image of one incompletely grown CNT secondary structure found in the CNT secondary structures according to Example 2 of the present invention.
Figure 13B:
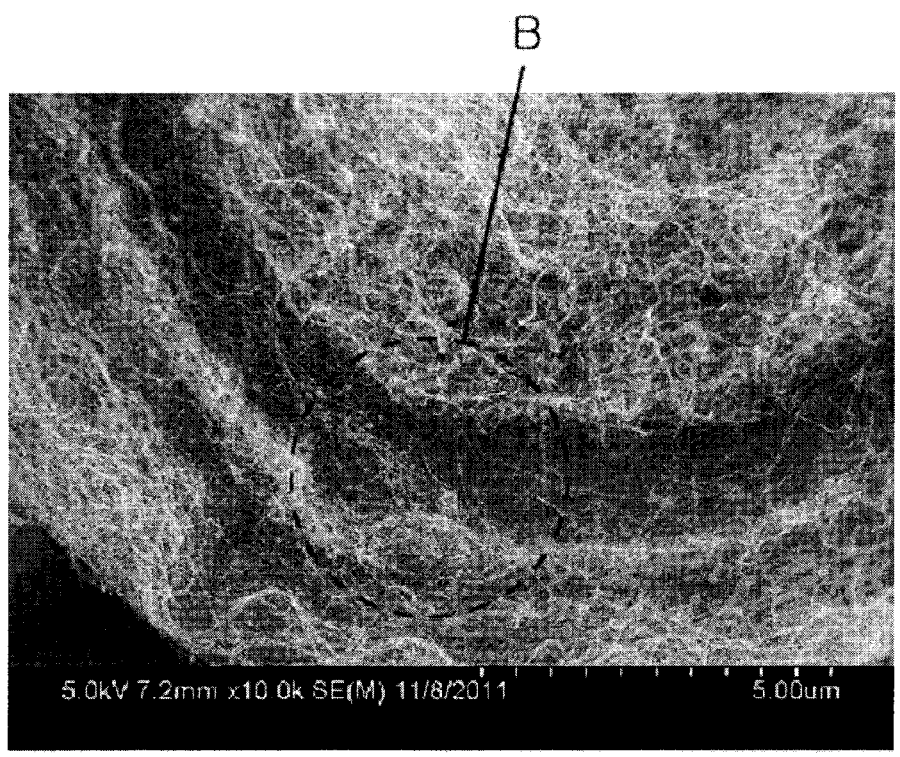
Figure 13C:
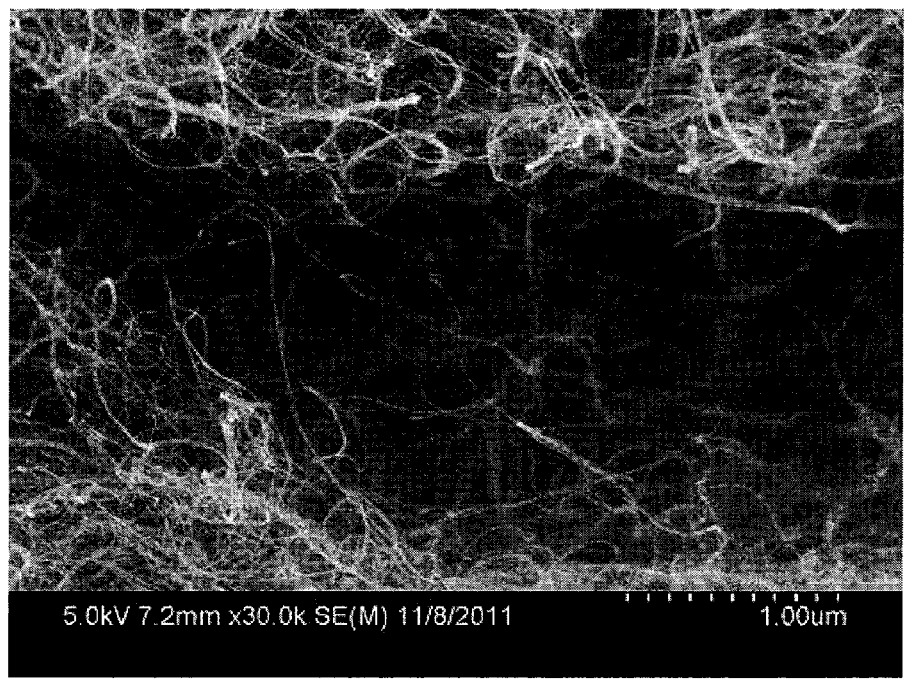
FIG. 13c is an enlarged SEM image of part B of FIG. 13b.

Further, as shown in FIGS. 13a to 13c, from the form of the incompletely grown CNT secondary structure, wherein the outer part did not completely cover the pore as the center part, it can be found that the center part of the CNT secondary structure according to the present invention was empty through not only at the part shown from the outside or the distribution density of the CNT was very low.

Test Method

1) Length, diameter (external diameter) and the like of the CNT secondary structure bundle or the CNT secondary structure were measured by using SEM (Scanning Electron Microscope). The used SEM device was FESEM (HITACHI S-4800), and the SEM observation condition was acceleration voltage of 5 kV, emission current of 10 µA, working distance of 8 mm and Detector SE.

2) Internal diameter of the CNT secondary structure was measured as follows. A circle having random radius was defined at the center of the black part of an image using Matlab-Image Processing Toolbox and space-dividing function of image process software, the image was digitalized by the number of black and white pixels, the contrast ratio was measured, and then the diameter when the contrast ratio is 90% was obtained.

3) Particle size ($d_{50}$) of the support was measured by using a particle size analyzer (Microtrac, Bluewave), fluid (water, 40%) and sonication (40 watt, 3 min).

INDUSTRIAL APPLICABILITY

The CNS secondary structure according to the present invention and the bundle formed by assembling thereof are novel, and the secondary structure can show novel characteristics. Accordingly, it can be applied to various fields such as energy materials, functional composites, medicines, batteries, semiconductors and the like.

What is claimed is:

1. A secondary carbon nanostructure (CNS) having a porous tube form, the porous tube form having a structure composed of a plurality of randomly-entangled primary nanostructures, wherein the plurality of primary nanostructures are a plurality of carbon nanotubes, and the tube form also having:
    a circular porous center part centered within the porous tube form; and
    an outer part surrounding and outward of the center part, wherein a distribution density of the plurality of carbon nanotubes at the center part is 1/3 or less than a distribution density of the plurality of carbon nanotubes at the outer part,
    wherein an external diameter defines an outer boundary of the outer part and is 1 to 30 µm,
    wherein an effective internal diameter defines the circular porous center part and is 0.5 to 9 µm, and
    wherein the secondary CNS has a length of 15 to 1,000 µm.

2. The secondary CNS according to claim 1, wherein at least one carbon nanotube has a diameter of 0.1 to 200 nm and a length of 1 µm to 10 mm.

3. The secondary CNS according to claim 1, wherein the plurality of carbon nanotubes comprise a single-walled carbon nanotube (SWCNT), a double-walled carbon nanotube (DWCNT), a multi-walled carbon nanotube (MWCNT) or any combination thereof.

4. The secondary CNS according to claim 1, wherein the plurality of carbon nanotubes comprises a double-walled carbon nanotube (DWCNT) in an amount of 10 wt % or less.

5. A bundle of secondary CNSs, comprising:
    a plurality of the secondary CNSs of claim 1 randomly assembled in a three-dimensional form.

6. The bundle of secondary CNSs according to claim 5, wherein the three-dimensional form of the bundle of the secondary CNSs is a spherical form, a spheroidal form, a cylindrical form, a conical form or a truncated conical form.

7. A composite comprising the secondary CNS according to claim 1.

8. A composite comprising the bundles of secondary CNSs according to claim 5.

9. A method for manufacturing the secondary CNS according to claim 1, comprising:
reacting a reaction gas comprising a carbon source in the presence of a supported catalyst,
wherein the supported catalyst is obtained by a process comprising:
preparing a milled processed support;
impregnating a catalyst metal to the support, thereby forming an impregnated resultant;
crushing the impregnated resultant, thereby forming a crushed resultant; and
calcining the crushed resultant;
wherein particle size ($d_{50}$) of the milled processed support is 0.1 to 1.5 μm,
wherein the milled processed support is an aluminum-based support, and
wherein the catalyst metal comprises cobalt (Co) and molybdenum (Mo).

10. The secondary CNS according to claim 1, wherein the porous tube form is assembled by the plurality of randomly assembled and entangled primary nano structures.

11. The secondary CNS according to claim 10, wherein the secondary CNS has an effective internal diameter of 0.1 to 30 μm.

12. The secondary CNS according to claim 10, wherein the external diameter of 1 to 100 μm and the secondary CNS has a length of 5 to 10,000 μm.

13. A bundle of secondary CNSs, comprising:
a plurality of the secondary CNSs of claim 10 randomly assembled in a three-dimensional form.

14. A composite comprising the bundle of secondary CNSs according to claim 13.

15. The secondary CNS according to claim 10, wherein the distribution density of the plurality of carbon nanotubes at the center part is 1/4 or less;
wherein at least one carbon nanotube has a diameter of 0.1 to 200 nm and a length of 1 μm to 10 mm;
wherein the tube form has an effective internal diameter is 0.5 to 3 μm;
wherein the tube form has an external diameter is 1 to 30 μm and the secondary CNS has a length of 15 to 1,000 μm;
wherein the plurality of carbon nanotubes comprise a single-walled carbon nanotube (SWCNT), a double-walled carbon nanotube (DWCNT), a multi-walled carbon nanotube (MWCNT) or any combination thereof;
and wherein the plurality of carbon nanotubes comprises a double-walled carbon nanotube (DWCNT) in an amount of 10 wt % or less.

16. A secondary carbon nanostructure (CNS) having a porous tube form, the porous tube form having a structure composed of a plurality of randomly entangled primary nano structures,
wherein the plurality of primary nanostructures are a plurality of carbon nanotubes, and the tube form also having:
a circular porous center part centered within the porous tube form; and
an outer part surrounding and outward of the center part,
wherein a distribution density of the plurality of carbon nanotubes at the center part is 1/3 or less than a distribution density of the plurality of carbon nanotubes at the outer part,
wherein an external diameter defines an outer boundary of the outer part and is 1 to 30 μm,
wherein an effective internal diameter defines a diameter of the circular porous center part of the porous tube form, and determined from a radius of a circle from the center of the porous part to a position within the porous tube form at which a contrast ratio of a digitalized electron microscopic image of a cross-section of the porous tube form is 90% as measured by using MATLAB-Image Processing Toolbox,
wherein the effective internal diameter is 0.5 to 9 μm, and
wherein the secondary CNS has a length of 15 to 1,000 μm.

* * * * *